(12) United States Patent
Rotstein

(10) Patent No.: US 6,533,350 B1
(45) Date of Patent: Mar. 18, 2003

(54) PARCEL RESTRAINT FOR AUTOMOBILE SEAT

(75) Inventor: Gali Rotstein, Encino, CA (US)

(73) Assignee: The Travel Play Company LLC, Encino, CA (US)

( * ) Notice: Subject to any disclaimer, the term of this patent is extended or adjusted under 35 U.S.C. 154(b) by 0 days.

(21) Appl. No.: 09/891,483

(22) Filed: Jun. 25, 2001

Related U.S. Application Data

(60) Provisional application No. 60/217,430, filed on Jul. 10, 2000.

(51) Int. Cl.[7] .................................................. A47C 7/62
(52) U.S. Cl. ............................ 297/188.04; 297/188.06; 297/188.07; 297/188.01
(58) Field of Search ........................ 297/188.04, 188.05, 297/188.06, 188.07, 188.2, 465; 224/275

(56) References Cited

U.S. PATENT DOCUMENTS

| | | | | | |
|---|---|---|---|---|---|
| 4,131,313 A | * | 12/1978 | Jacobs | ......................... | 224/275 |
| 5,354,119 A | * | 10/1994 | Nicholas | ...................... | 224/275 |
| 5,795,030 A | * | 8/1998 | Becker | ...................... | 280/808 |
| 5,915,789 A | * | 6/1999 | Ponce De Leon, III | ..... | 297/254 |
| 6,053,570 A | * | 4/2000 | Stern et al. | ............... | 211/86.01 |
| 6,079,773 A | * | 6/2000 | Hassan | ........................ | 297/112 |
| 6,276,582 B1 | * | 8/2001 | Alexander | .................... | 217/16 |

* cited by examiner

Primary Examiner—Peter M. Cuomo
Assistant Examiner—Sarah C. Burnham
(74) Attorney, Agent, or Firm—H. Michael Brucker

(57) ABSTRACT

A device for restraining parcels and other objects that are typically transported in an automobile on a passenger seat.

15 Claims, 1 Drawing Sheet

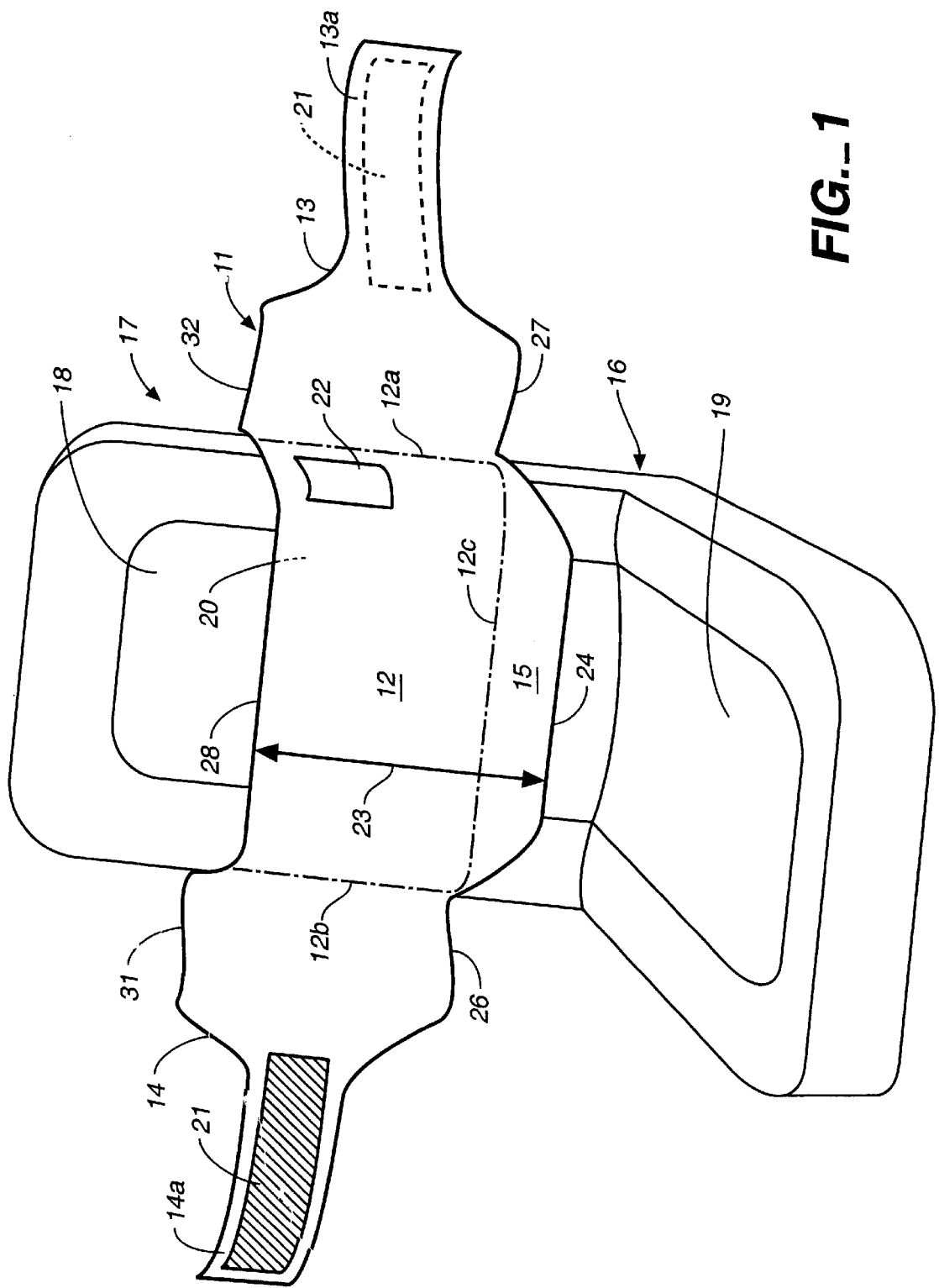
FIG._1

PARCEL RESTRAINT FOR AUTOMOBILE SEAT

This application claims the benefit of 60/217,430, filed Jul. 10, 2001.

BACKGROUND OF THE INVENTION

The present invention is a device for restraining parcels and other objects that are typically transported in an automobile on a passenger seat. It is a common experience for such parcels and like objects to slide off of the seat onto the automobile floor when the automobile is brought to a halt.

Prior art devices for holding objects from sliding off of automobile seats suffer from several disadvantages, including that they need to be removed from the seat before the seat can be occupied by a passenger.

BRIEF DESCRIPTION OF THE INVENTION

In the present invention, a neoprene (or like elastic material) belt is designed to encircle the upright portion of an automobile seat and provide a bottomless pocket with the seat back into which parcels, such as handbags, books, water bottles and the like, can be conveniently stowed and which are restrained from falling off of the seat when the automobile is brought to a halt. The pocket-forming component of the belt covers the passenger seat back support and is free from any seams or protrusions that would cause discomfort to a passenger.

The restraining device of the present invention can also include a pocket into which a cell phone, for example, can be placed, provided the pocket is off to the side and not in a location where a seated passenger would contact the pocket.

The bottomless pocket formed between the belt of the present invention and the upright portion of the seat permits objects to be inserted into the pocket from below, as well as above. For example, the top of an open briefcase can be inserted under the belt, making the briefcase contents available to the driver while restraining the briefcase so that it is not discharged onto the floor, along with its contents, every time the automobile is brought to a halt.

Accordingly, it is an object of the present invention to provide a parcel restraint device for an automobile seat that is easy to install, does not have to be removed when the seat is occupied by a passenger and conveniently stows parcels from above or below.

The foregoing and other objectives, features and advantages of the invention will be more readily understood upon consideration of the following detailed description of the invention taken in conjunction with the accompanying drawing.

BRIEF DESCRIPTION OF THE DRAWING

FIG. 1 is a plan view of the belt restraining device of the present invention shown in relationship to an automobile seat with which it is designed to be used.

DETAILED DESCRIPTION OF THE PREFERRED EMBODIMENT

Referring to FIG. 1, a parcel restraint belt 11 of the present invention is sized to encircle the seat back 17 of an automobile seat 16.

In the preferred embodiment, the belt 11 is formed from a single piece of elastic material such as neoprene. The belt 11 has four components: (1) a pocket-forming component 12 which has a width measured from edge 12a to edge 12b that is approximately the same as the width of seat back 17 and a height 23 of six to nine inches or more; (2) a first securing component 13 extending from edge 12a of pocket-forming component 12 to end 13a a distance sufficient to reach around to the back surface 17a of seat back 17; (3) a second securing component 14 extending from opposite edge 12b of pocket-forming component 12 to end 14a a distance sufficient to reach around to the back surface 17a of seat back 17; and (4) an access flap 15 that depends from the lower edge 12c of pocket-forming component 12. Edge lines 12a, 12b and 12c are shown in dotted lines to indicate that they demark different areas (components) of what is preferably a single piece of material. The invention, however, includes a belt formed from multiple pieces of material sewn, glued or otherwise integrated into a single structure, so long as they do not include protruding seams or other elements that would cause discomfort to a passenger.

The securing components 13 and 14 can be joined around the back of the seat back 17 adjacent the seat back surface 17a to hold pocket-forming portion 12 in place to form a bottomless pocket 20 with the seat back surface 18 which is generally parallel to back surface 17a. The pocket 20 can conveniently receive items commonly carried on a passenger seat of an automobile, such as handbags, water bottles, maps, books, etc., all of which are restrained from sliding off of the seat when the automobile is brought to a stop, as would be the case if these items were simply placed on the seat bottom 19.

In the preferred embodiment, the belt securing components 13 and 14 have affixed thereto interacting strips of hook and loop material 21 (VELCRO®) by which the ends 13a and 14a can be attached together behind seat back 17 holding the belt 11 in place. It will be obvious to those skilled in the art that the means of attaching end 13a to end 14a to secure belt 11 in place is not limited to the use of hook and loop strips. Numerous devices are known in the art for attaching two ends of material together, including snaps, buttons, hooks, and/or magnets, as well as adjustable straps with bayonet connectors. The advantage of the hook and loop strips 21 is that they provide adjustability for seats of varying width.

By having the belt 11 formed from a single piece of material, the pocket-forming component 12 which overlays the passenger back support surface 18 is free from any seams or other protrusions. Accordingly, when the belt 11 is emptied of its contents, a passenger can comfortably sit in seat 16 without the necessity of removing the belt 11. Once again, it will be obvious to those skilled in the art that pocket-forming component 12 of the belt 11 could be made from more than one piece of material while still avoiding any protruding seams or the like which would cause discomfort to a passenger seated in seat 16 while the belt 11 was attached. Thus, one aspect of the invention resides in a pocket-forming portion 12 free from protrusions or other elements that could cause discomfort to a passenger.

A pocket 22 can be formed at the extreme edge of pocket-forming section 12 so as to overlay that portion of the seat back component 17 which is not engaged by a passenger when seated in the seat. Pocket 22 could be used conveniently for storing a cell phone or the like.

It is advantageous to have an access flap 15 depending from the lower edge 12c of pocket-forming component 12. Flap 15 allows parcels to be easily inserted from the bottom of pocket 20, as well as the top when that is advantageous— such as in the case of a briefcase lid. Since flap 15 is in the area where a passenger contacts seat back surface 18, it is preferred that flap 15 be integral with pocket-forming component 12 to avoid discomforting elements such as seams or protrusions.

In order that the belt 11 provide a pocket for storing a wide variety of items, in the preferred embodiment, the overall height 23 of the pocket-forming component 12 and flap 15 is at least six, and preferably at least nine, inches.

The upper edge 28 of pocket-forming component 12 is lower than adjacent upper edges 31 and 32 of securing components 14 and 13, respectively, to facilitate the insertion and removal of parcels from the top of the pocket 20.

From the foregoing, the invention is seen to be a parcel restraint device for use with an automobile passenger seat comprising in combination a generally rectangular pocket-forming component 12 of elastic material, such as neoprene, defined by a lower edge 12c, an upper edge 28 and two side edges 12a and 12b; a first securing component 13 extending from edge 12a of pocket-forming component 12 and defined by a side edge 12a, an upper edge 32, a lower edge 27 and a distal end 13a; a second securing component 14 extending from edge 12b of pocket-forming component 12 and defined by a side edge 12b, an upper edge 31, a lower edge 26 and a distal end 14a; an access flap 15 extending from the lower edge 12c of pocket-forming component 12; and attachment means 21 (such as hook and loop fastener) for attaching the distal ends 13a and 14a of securing components 13 and 14 together. The lower edges 26 and 27 of securing components 14 and 13, respectively, are relatively higher than the access flap 15 at the side edges 12b and 12a of the pocket-forming component 12, while the upper edges 31 and 32 of securing components 14 and 13, respectively, are relatively higher than the upper edge 28 of pocket-forming component 12.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A parcel restraint device for use with an automobile passenger seat which seat has an upstanding seat back defined by a passenger back support surface and a rear surface generally parallel to the back support surface, comprising in combination:
   a generally rectangular belt of elastic material having a pocket-forming member between two securing components for securing the device to a seat back and which securing components each have a free end;
   said belt having a length sufficient to encircle an upstanding seat back;
   attachment means on said securing components for attaching said ends of said securing components together adjacent the rear surface of a seat back and thereby affixing the device to a seat back;
   whereby when the device is operatively attached to a seat back said pocket-formiing component is disposed to cover a portion of the passenger back support surface and form a bottomless pocket therewith and said securing components are attached adjacent the rear surface of the seat back; and
   said pocket-forming component being free of protrusions.

2. The parcel restraining device of claim 1 wherein said pocket-forming component has a height of at least six inches.

3. The parcel restraining device of claim 1 wherein said pocket-forming component is formed from a single piece of material.

4. The parcel restraining device of claim 1 wherein said belt is formed from a single piece of elastic material.

5. The parcel restraining device of claim 3 wherein said pocket-forming component is formed of neoprene.

6. The parcel restraining device of claim 4 wherein said elastic material is neoprene.

7. The parcel restraining device of claim 4 wherein said attachment means is a hook and loop fastener.

8. The parcel restraining device of claim 3 wherein said pocket-forming component has a depending flap.

9. The parcel restraining device of claim 8 further including a pocket formed at the intersection of said pocket-forming component and one of said securing components.

10. A parcel restraint device for use with an automobile passenger seat, comprising in combination:
    a generally rectangular pocket-forming component of elastic material defined by a lower edge, an upper edge and two side edges;
    a first securing component extending from one of the two side edges of said pocket-forming component and defined by a side edge, an upper edge, a lower edge and a distal end;
    a second securing component extending from the other of the two side edges of said pocket-forming component and defined by a side edge, an upper edge, a lower edge and a distal end;
    an access flap extending from the lower edge of said pocket-forming component; and
    attachment means for attaching the distal ends of said securing components together.

11. The parcel restraining device of claim 10 wherein one of the side edges of said pocket-forming component is the side edge of said first securing component and the other side edge of said pocket-forming component is the side edge of said second securing component and the lower edges of said first and second securing components are relatively higher than said access flap at the side edges of said pocket-forming component.

12. The parcel restraining device of claim 10 wherein the upper edge of said pocket-forming component is relatively lower than the upper edge of said first securing component and the upper edge of said second securing component.

13. The parcel restraining device of claim 10 wherein said pocket-forming component and said first and second securing components and said access flap are all formed from a single piece of elastic material.

14. The parcel restraining device of claim 11 wherein said pocket-forming component and said first and second securing components and said access flap are all formed from a single piece of elastic material.

15. The parcel restraining device of claim 12 wherein said pocket-forming component and said first and second securing components and said access flap are all formed from a single piece of elastic material.

* * * * *